United States Patent
Frank et al.

(10) Patent No.: US 9,873,322 B2
(45) Date of Patent: Jan. 23, 2018

(54) CLOSURE ASSEMBLY FOR FUEL TANK FILLER NECK

(71) Applicant: Stant USA Corp., Connersville, IN (US)

(72) Inventors: Louis T. Frank, Connersville, IN (US); Joshua L. Rude, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 0 days.

(21) Appl. No.: 15/268,067

(22) Filed: Sep. 16, 2016

(65) Prior Publication Data

US 2017/0072790 A1    Mar. 16, 2017

Related U.S. Application Data

(60) Provisional application No. 62/219,513, filed on Sep. 16, 2015, provisional application No. 62/240,719, filed on Oct. 13, 2015.

(51) Int. Cl.
*B60K 15/04* (2006.01)

(52) U.S. Cl.
CPC .. *B60K 15/0409* (2013.01); *B60K 2015/0429* (2013.01)

(58) Field of Classification Search
CPC . B60K 15/0409; B60K 15/0406; B60K 15/04
USPC ..... 220/86.2, 86.1, 293, 298, 288, 300, 301, 220/302
See application file for complete search history.

(56) References Cited

U.S. PATENT DOCUMENTS

| | | | |
|---|---|---|---|
| 4,676,390 A | 6/1987 | Harris | |
| 5,271,438 A | 12/1993 | Griffin et al. | |
| 5,730,194 A | 3/1998 | Foltz | |
| 5,732,840 A | 3/1998 | Foltz | |
| 6,189,581 B1 | 2/2001 | Harris et al. | |
| 6,315,144 B1 | 11/2001 | Foltz | |
| 6,336,482 B1* | 1/2002 | Cunkle | B60K 15/04 141/301 |
| RE37,776 E | 7/2002 | Foltz | |
| 6,431,228 B2 | 8/2002 | Foltz et al. | |
| 6,446,826 B1 | 9/2002 | Foltz et al. | |
| 6,546,972 B1 | 4/2003 | Foltz | |
| 6,554,150 B2 | 4/2003 | Foltz | |
| 6,679,396 B1 | 1/2004 | Foltz et al. | |
| 6,755,057 B2 | 6/2004 | Foltz | |
| 6,923,224 B1 | 8/2005 | McClung et al. | |
| 6,942,117 B2 | 9/2005 | Foltz | |
| 7,063,113 B2* | 6/2006 | Ropert | B60K 15/0406 141/350 |
| 7,850,756 B1* | 12/2010 | Senetar, III | B01D 46/0004 210/338 |
| 7,882,862 B2 | 2/2011 | DeCapua et al. | |

(Continued)

OTHER PUBLICATIONS

Written Opinion issued in connection with International Application No. PCT/US2016/052272, dated Dec. 20, 2016, 13 pages.

*Primary Examiner* — Robert J Hicks
(74) *Attorney, Agent, or Firm* — Barnes & Thornburg LLP

(57) ABSTRACT

A fuel tank apparatus is adapted to conduct fuel toward the fuel tank of a vehicle. The fuel tank fill apparatus includes a fuel-tank filler neck for conducting fuel to the fuel tank and a capless closure assembly the couples to the fuel-tank filler neck in such a way so as to be removed for serviceability.

20 Claims, 12 Drawing Sheets

(56) References Cited

U.S. PATENT DOCUMENTS

| | | | |
|---|---|---|---|
| 8,424,705 B2* | 4/2013 | Palmer | G01D 11/26 220/293 |
| 2001/0035415 A1 | 11/2001 | Hilger et al. | |
| 2007/0125444 A1* | 6/2007 | Hagano | B60K 15/04 141/350 |
| 2011/0108563 A1* | 5/2011 | Gerdes | B60K 15/04 220/810 |
| 2012/0217240 A1 | 8/2012 | Dutzi et al. | |
| 2012/0279612 A1* | 11/2012 | Washio | B60K 15/04 141/350 |
| 2014/0332529 A1* | 11/2014 | Ryu | B60K 15/04 220/86.2 |
| 2016/0031317 A1 | 2/2016 | Giles et al. | |

* cited by examiner

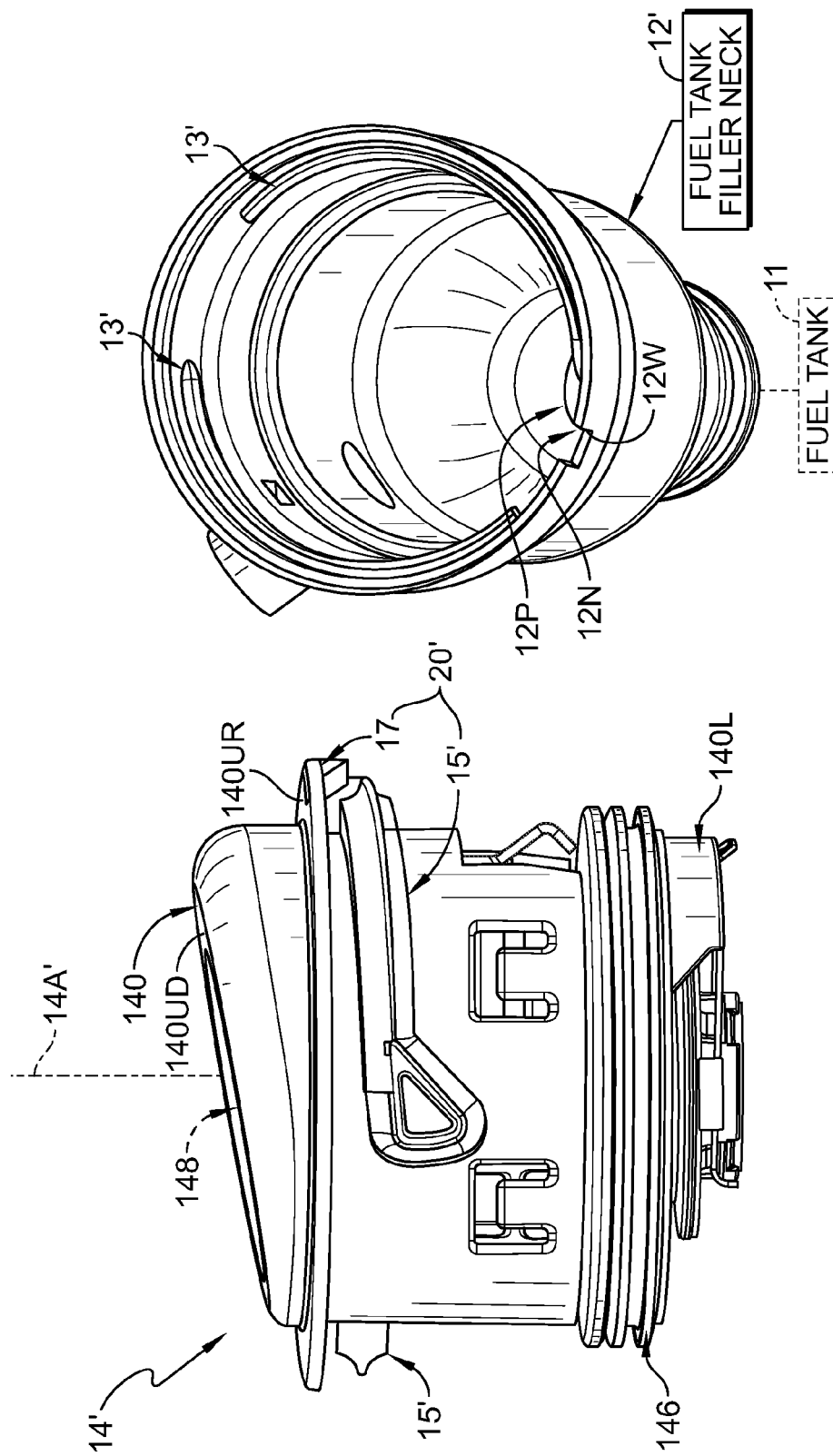

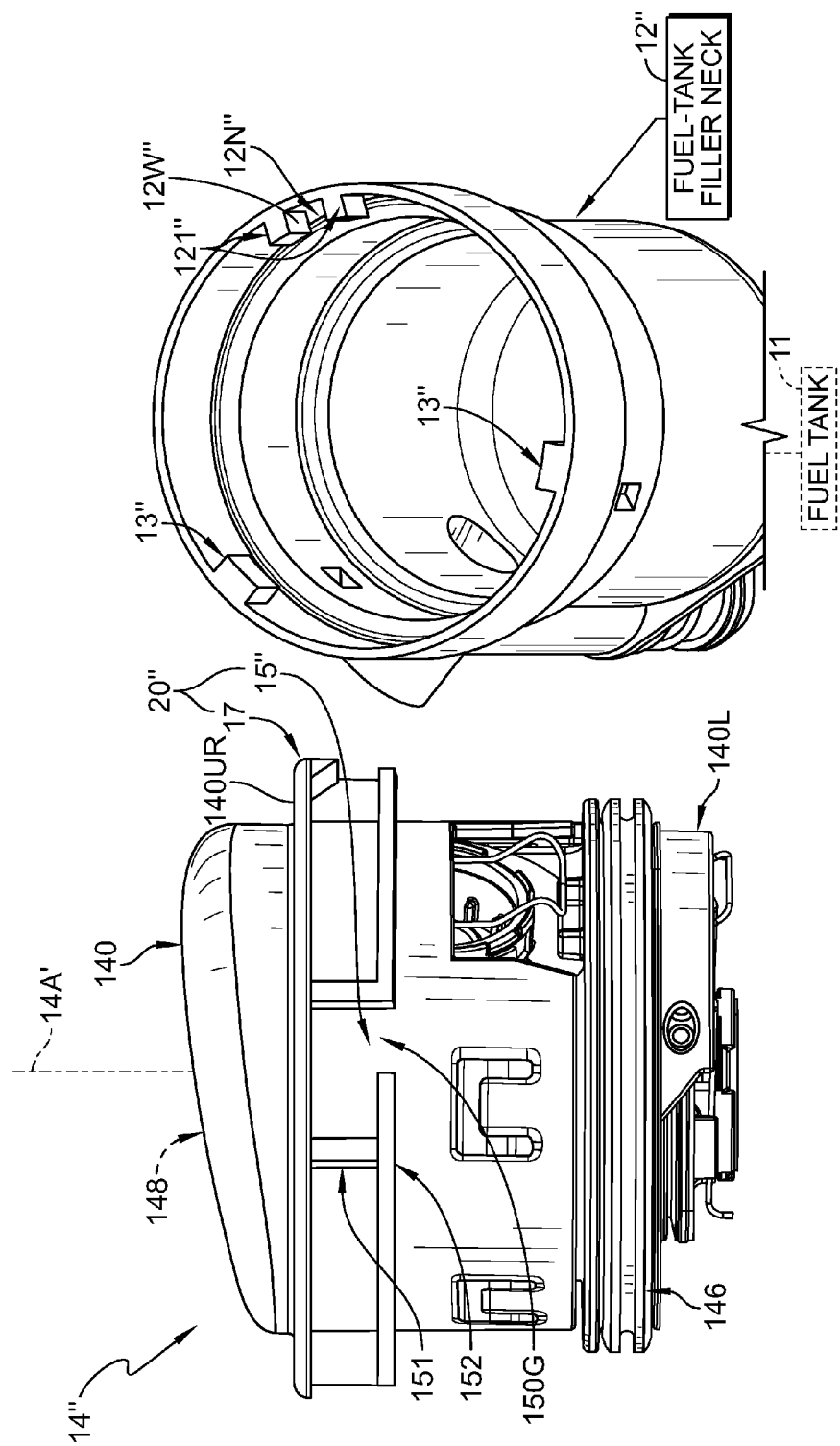

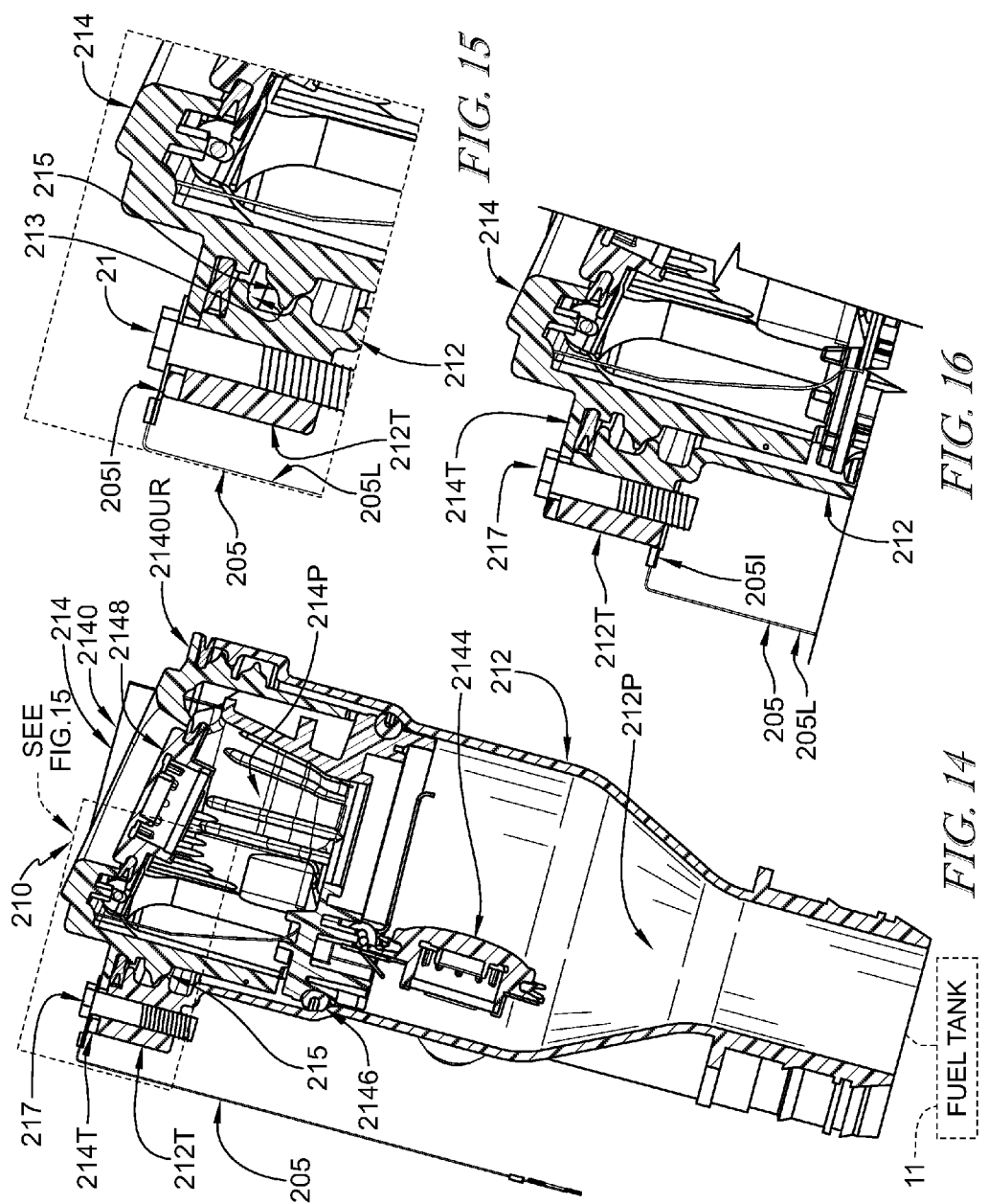

CLOSURE ASSEMBLY FOR FUEL TANK FILLER NECK

PRIORITY CLAIM

This application claims priority under 35 U.S.C. § 119(e) to U.S. Provisional Application Ser. No. 62/219,513, filed Sep. 16, 2015, and to U.S. Provisional Application Ser. No. 62/240,719, filed Oct. 13, 2015, which are both expressly incorporated by reference herein.

BACKGROUND

The present disclosure relates to a closure assembly for a tank filler neck, and particularly to a capless closure assembly for a vehicle fuel tank that operates to close the filler neck automatically as soon as a fuel-dispensing pump nozzle is removed from the filler neck following refueling of the tank. More particularly, the present disclosure relates to a system for coupling a capless closure assembly to a fuel-tank filler neck.

SUMMARY

According to the present disclosure, a fuel tank filler apparatus comprises a capless filler neck closure that is adapted to be mated with an outer end of a fuel-tank filler neck. In illustrative embodiments, the capless filler neck closure is rotated about an axis at a factory to mate with the outer end of the fuel-tank filler neck during a closure installation process.

In illustrative embodiments, the capless filler neck closure comprises a nozzle-insertion housing that is sized to extend into a fuel-conducting passageway formed in a fuel-tank filler neck and a spring-biased flapper door. The spring-biased flapper door is mounted on the nozzle-insertion housing for movement relative to the nozzle-insertion housing between a closed position closing a nozzle-receiving aperture formed in the nozzle-insertion housing and an opened position opening the nozzle-receiving aperture. During vehicle refueling, a user inserts the tip of a fuel-dispensing pump nozzle into a nozzle-receiving channel formed in the nozzle-insertion housing and moves the tip inwardly to push the spring-biased flapper door to the opened position and then extends the nozzle tip into the fuel-conducting passageway formed in the fuel-tank filler neck.

In illustrative embodiments, the rotatable capless filler neck closure further comprises a rotatable engagement mechanism such as screw threads or the like coupled to the nozzle-insertion housing of the rotatable capless filler neck closure. The rotational engagement mechanism provides installation-and-detachment guide means for engaging a fuel-tank filler neck to retain the nozzle-insertion housing temporarily in a stationary installed position and for rotatably disengaging the fuel-tank filler neck so as to allow for removal of the rotatable capless filler neck closure from the fuel-tank filler neck to facilitate servicing or repair of the rotatable capless filler neck closure. In illustrative embodiments, the installation-and-detachment guide means is configured to rotatably engage the fuel-tank filler neck in response to, for example, a rotation of the rotatable capless filler neck closure about an axis of rotation through an angle of 45° (i.e. eighth-turn), 90° (i.e. quarter turn), or more than 360° (i.e. full turn). In illustrative embodiments, the installation-and-detachment guide means includes an external thread that is coupled to the nozzle-insertion housing and configured to mate with a companion internal thread included in the fuel-tank filler neck.

In illustrative embodiments, the rotatable capless filler neck closure further comprises an anti-rotation feature coupled to the nozzle-insertion housing of the rotatable capless filler neck closure. The anti-rotation feature provides anti-rotation means for retaining the nozzle-insertion housing temporarily in the stationary installed position in the fuel-conducting passageway in the fuel-tank filler neck.

In illustrative embodiments, a lock tab provides the anti-rotation feature and is cantilevered to the nozzle-insertion housing. The lock tab illustratively has a pawl tooth and a resilient tooth-support finger. The pawl tooth is sized to fit into a tooth-receiving notch formed in the fuel-tank filler neck following arrival of the nozzle-insertion housing at the stationary installed position. The resilient tooth-support finger has a proximal end that is coupled to the nozzle-insertion housing and a distal end that is coupled to the pawl tooth.

In illustrative embodiments, the lock tab that is included in the anti-rotation feature is configured to be broken by a service technician so that the rotatable capless filler neck closure can be removed from its installed position in the fuel-tank filler neck for servicing or repair. When service or repair has been completed, a new nozzle-insertion housing with an unbroken anti-rotation lock tab is used to replace the original nozzle-insertion housing having the broken anti-rotation lock tab and a refurbished rotatable capless filler neck closure including the new nozzle-insertion housing is engaged to the fuel tank filler neck to assume the stationary installed position in the filler neck.

In illustrative embodiments, a lock bolt provides the anti-rotation feature for blocking rotation of the capless closure assembly relative to the fuel-tank filler neck. The lock bolt extends through an aperture formed in the capless closure assembly and engages the fuel-tank filler neck. The lock bolt can be removed by a technician to allow rotation of the capless closure assembly in a removal direction so that the capless closure assembly may be serviced or replaced.

Rotatable capless filler neck closures made in accordance with the present disclosure are adapted to be mounted on and removed from a fuel-tank filler neck at a factory or a closure refurbishment center by a service technician. The capless filler neck closure is used instead of a fuel cap and is configured to permit a user to use a fuel-dispensing pump nozzle to discharge fuel into the fuel-tank filler neck through a nozzle-receiving passageway formed in the rotatable capless filler neck closure without removing a fuel cap from the fuel-tank filler neck. However, the rotatable capless filler neck closure is configured to be reconfigured or broken by a service technician so that the rotatable capless filler neck closure can be rotated relative to the fuel-tank filler neck and removed from the fuel-tank filler neck for servicing.

In illustrative embodiments, the rotatable capless filler neck closure is not welded permanently in a stationary installed position in the filler neck. Rather, the rotatable capless filler neck closure is configured to be engaged to and disengaged from the fuel-tank filler neck only by a factory or service technician in response to rotation of the rotatable capless filler neck about an axis relative to the fuel-tank filler neck after disengagement of an anti-rotation feature.

Additional features of the disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 8 is a side elevation view of a capless filler neck closure having a quarter-turn thread concept in accordance with another embodiment of the present disclosure;

FIG. 9 is a perspective view of a companion fuel-tank filler neck configured to mate with the capless filler neck closure shown in FIG. 8;

FIG. 10 is a side elevation view of a capless filler neck closure having an eighth-turn thread concept in accordance with another embodiment of the present disclosure;

FIG. 11 is a perspective view of a companion fuel-tank filler neck configured to mate with the capless filler neck closure shown in FIG. 2A0;

FIG. 14 is a sectional view of the fuel tank fill assembly of FIG. 12 showing that the closure retention system further includes threads that engage corresponding threads included in the fuel-tank filler neck;

FIG. 15 is an enlarged detailed view of a portion of FIG. 14 showing that a ground wire is included in the fuel tank fill assembly and is engaged with the lock bolt head; and FIG. 16 is an enlarged detailed view similar to FIG. 15 showing that the ground wire included in the fuel tank fill assembly can be engaged with the lock bolt threads.

DETAILED DESCRIPTION

Figure 4:
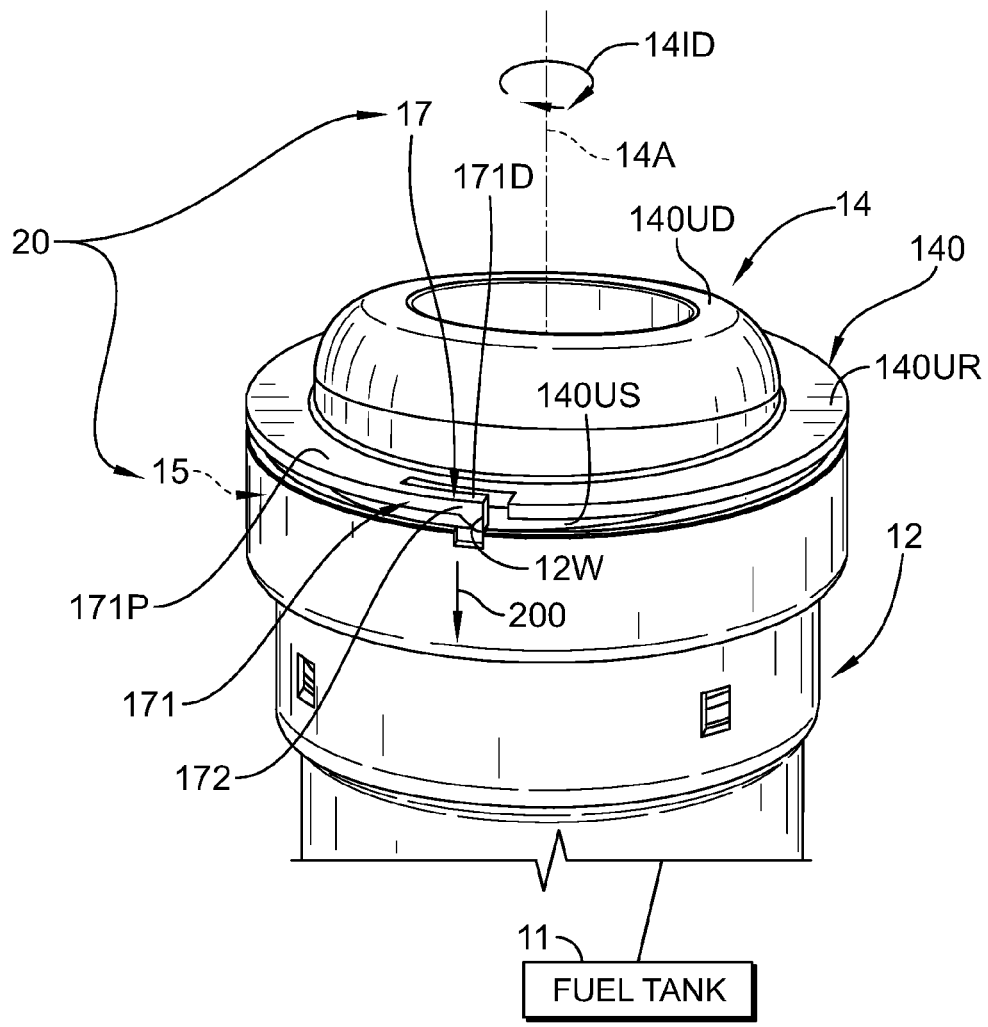
FIG. 4 is a view similar to FIG. 3 showing clockwise rotation of the rotatable capless filler neck closure about an axis of rotation to cause an external thread included in the rotatable capless filler neck closure to engage a companion internal thread included in the fuel-tank filler neck as shown, for example, in FIG. 7 during installation of the rotatable capless filler neck closure into the fuel-tank filler neck at a factory and showing that the pawl tooth of the anti-rotation lock tab is approaching but has not yet reached a companion tooth-receiving notch formed in the fuel-tank filler neck.
Figure 5:
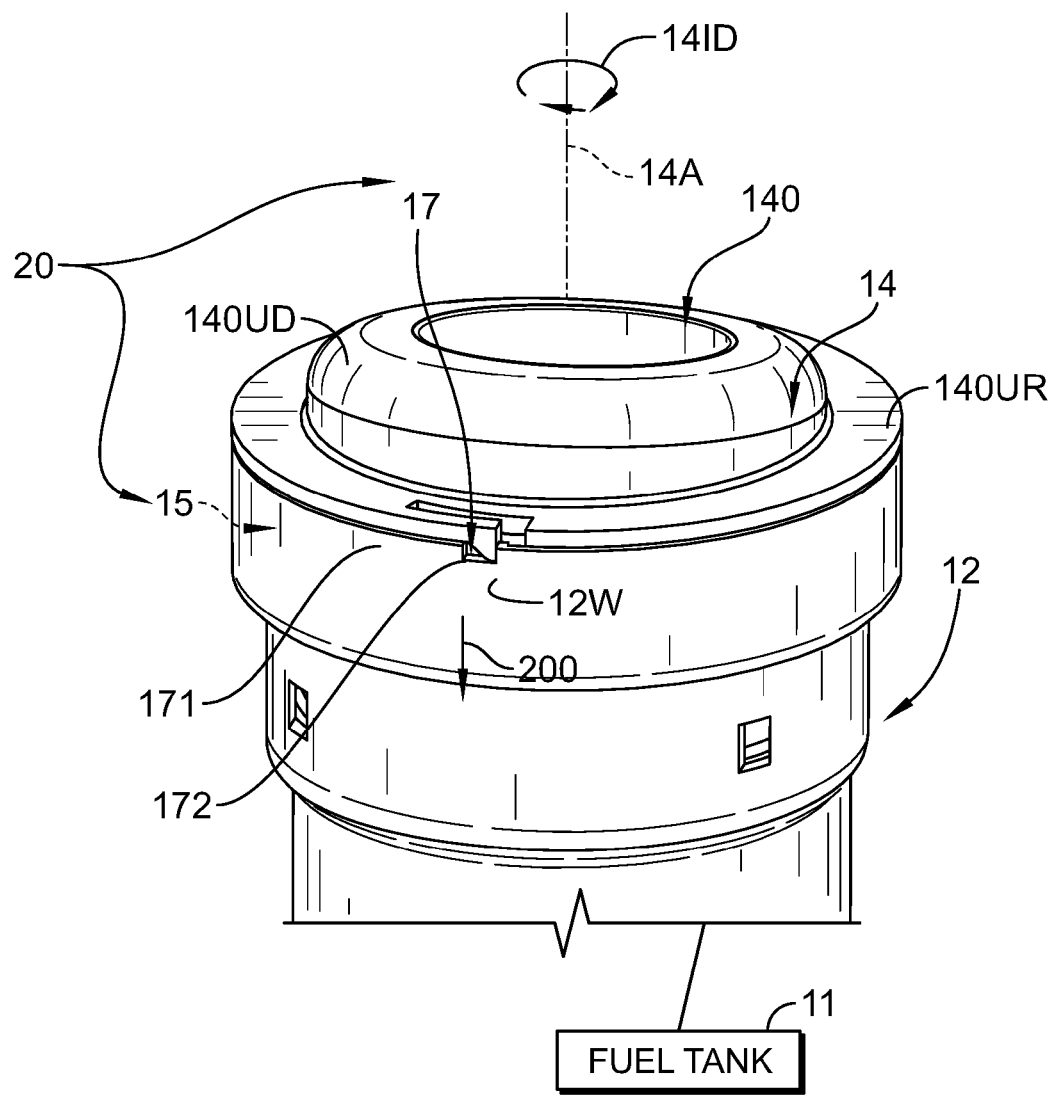
FIG. 5 is a view similar to FIGS. 3 and 4 showing arrival of the rotating capless filler neck closure at a stationary installed position on the fuel-tank filler neck and showing that the pawl tooth provided on the end of a tooth-support finger also included in the anti-rotation lock tab extends downwardly into the tooth-receiving notch formed in an outer rim of the fuel-tank filler neck to retain the rotatable capless filler neck closure temporarily (i.e. until the anti-rotation lock tab is later broken intentionally by a service technician) in a stationary installed position in the fuel-tank filler neck.

A fuel tank filler apparatus 10 in accordance with the present disclosure includes a fuel-tank filler neck 12 associated with a fuel tank 11 and a rotatable capless filler neck closure 14 as suggested in FIGS. 1B, 2A, 3, and 6. Rotatable capless filler neck closure 14 includes an external thread 15 that engages a companion internal thread 13 included in fuel-tank filler neck 12 in response to rotation 141D about an axis 14A during installation of capless filler neck closure 14 in filler neck 12 as suggested in FIGS. 3-5. Rotatable capless filler neck closure 14 also includes an anti-rotation lock tab 17 that engages a rotation-blocking wall 12W included in fuel-tank filler neck 12 to retain capless filler neck closure 14 temporarily in a stationary installed position following rotary installation as shown in FIGS. 2 and 5.

Capless filler neck closure 14 is not welded permanently to fuel-tank filler neck 12 when installed at a factory and is removable by service technicians for service in accordance with the present disclosure. A closure retention system 20 as described herein includes a rotational engagement mechanism (e.g. threads) 15 that facilitates factory installation and an anti-rotation feature (i.e. anti-rotation lock tab) 17 that blocks unintentional removal of capless filler neck closure 14. In illustrative embodiments, a service technician would break or bend out the anti-rotation lock tab 17 so that the rotatable capless filler neck closure 14 could be rotated by the service technician to disengage thread 15 to allow rotatable capless filler neck closure 14 to be removed from filler neck 12 for service. Once serviced, the service technician in accordance with the present disclosure can discard the portion of the rotatable capless filler neck closure 14 that includes a potentially broken anti-rotation lock tab 17 and replace it with a new component including a new anti-rotation lock tab 17.

Figure 1A:
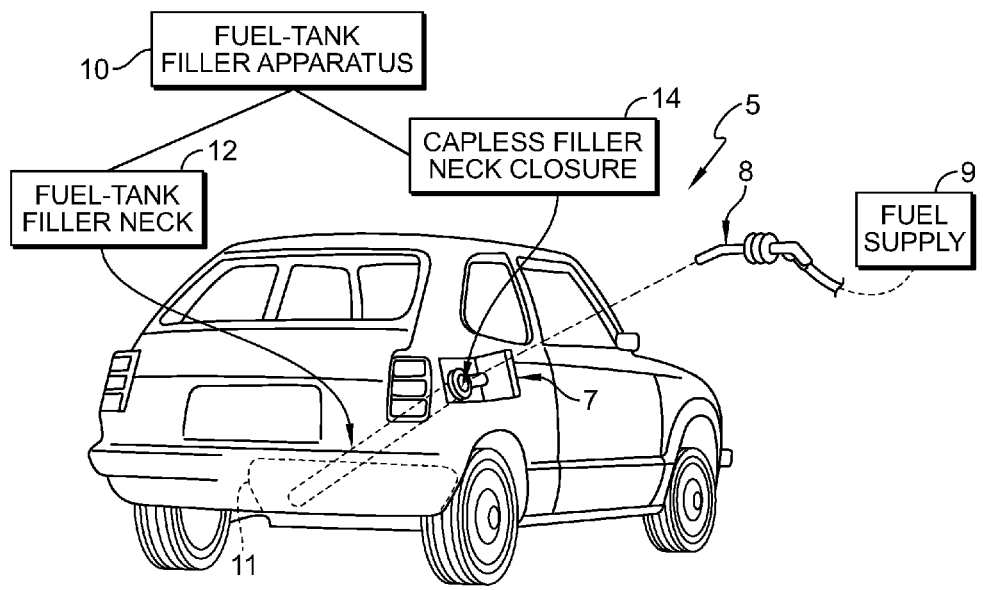
FIG. 1A is a perspective view of a vehicle including including a capless fuel-tank filler neck closure that is exposed when an outer fuel door is opened suggesting that a fuel nozzle may be inserted into a fuel-tank filler neck coupled to the capless fuel-tank filler neck closure to refuel a corresponding fuel tank through the without removal of a cap or other component of the closure.

According to the present disclosure, a fuel tank filler apparatus 10 is configured for inclusion in a vehicle 5 and conducts liquid fuel from a fuel nozzle 8 coupled to a fuel supply 9 as suggested in FIG. 1. The fuel tank filler apparatus 10 comprises a rotatable capless filler neck closure 14 that is adapted to be mated by rotation with an outer end 120 of a fuel-tank filler neck 12 that is accessible via door 7 of vehicle 5. Capless filler neck closure 14 comprises a nozzle-insertion housing 140 that is sized to extend into a fuel-conducting passageway 12P formed in fuel-tank filler neck 12 and a spring-biased flapper door 144 mounted on nozzle-insertion housing 140 for movement relative to nozzle-insertion housing 140 between a closed position closing a nozzle-receiving aperture 140A formed in nozzle-insertion housing 140 and an opened position opening the nozzle-receiving aperture 140A.

Figure 1B:
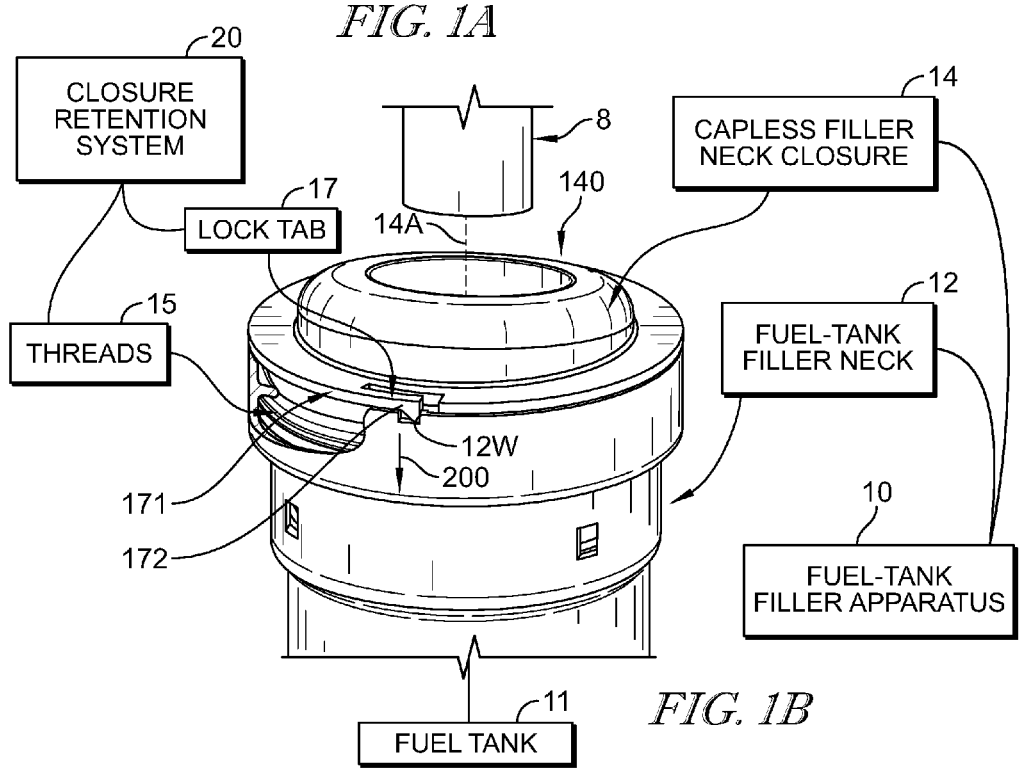
FIG. 1B is a perspective view of the capless filler neck closure mounted on the fuel-tank filler neck to provide a fuel tank fill apparatus and showing that the capless filler neck closure is coupled to the fuel-tank filler neck by a closure retention system including threads and a lock tab configured to allow a technician to remove the capless filler neck closure for service but to resist unintended removal by a vehicle user.
Figure 3:
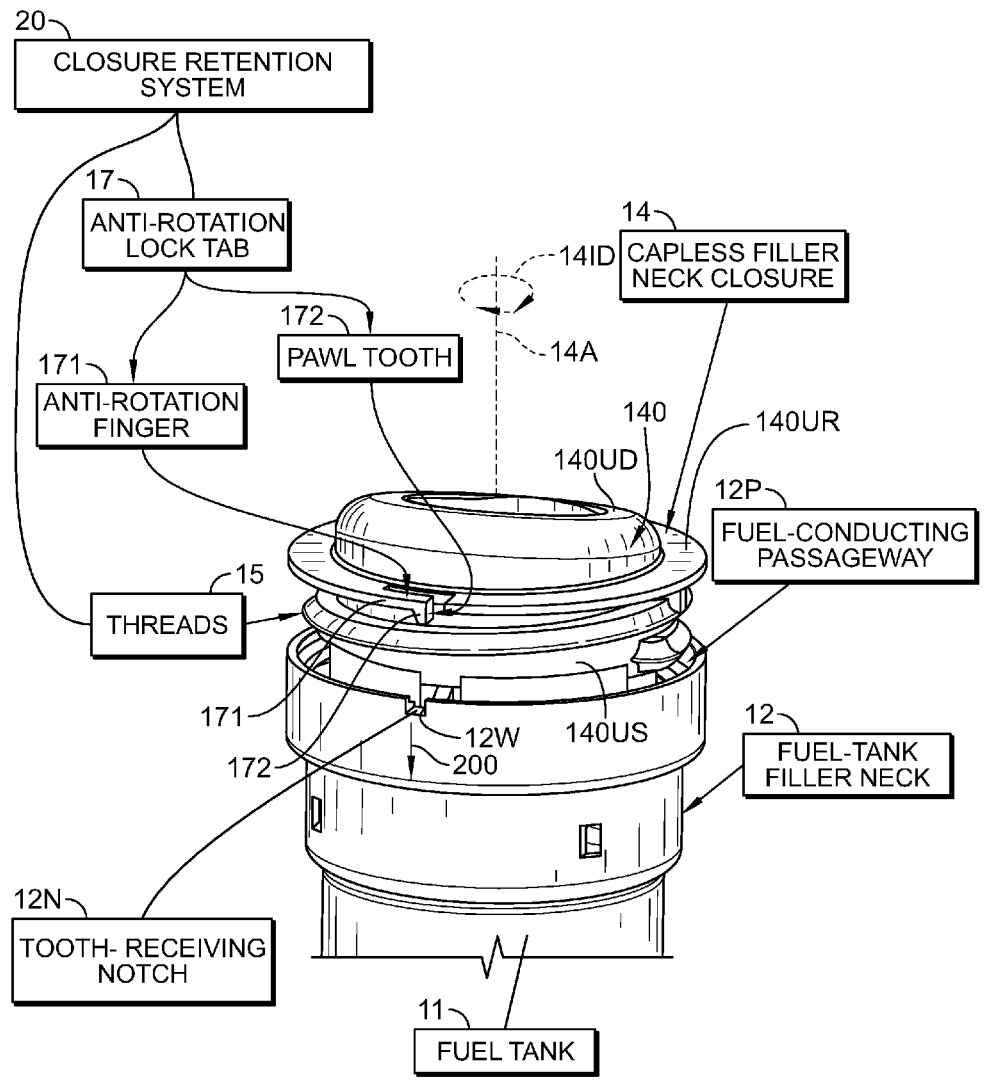
FIG. 3 is an exploded perspective assembly view showing downward movement of the capless filler neck closure into a fuel-conducting passageway formed in a fuel-tank filler neck that is coupled to a fuel tank to close off the fuel-tank filler neck.
Figure 6:
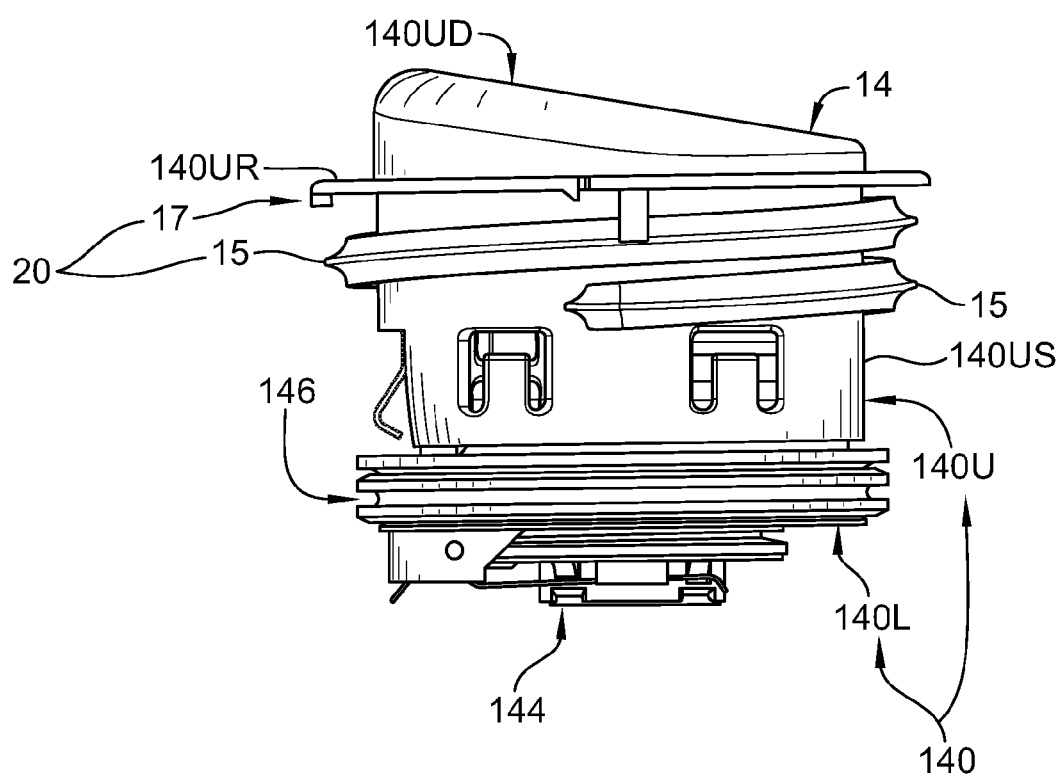
FIG. 6 is a reduced side elevation view of the rotatable capless filler neck closure of FIGS. 2-5 showing an illustrative external fuel thread appended to the nozzle-insertion housing of the rotatable capless filler neck closure.

Capless filler neck closure 14 further comprises a rotational engagement mechanism illustrated as external threads 15 shown in FIGS. 1B, 3, and 6. Threads 15 are configured to provide installation-and-detachment guide means coupled to the nozzle-insertion housing 140 for engaging fuel-tank filler neck 12 in response to rotation of nozzle-insertion housing 140 in an installation direction to retain nozzle-insertion housing 140 temporarily in a stationary installed position in fuel-conducting passageway 12P in fuel-tank filler neck 12 and for rotatably disengaging fuel-tank filler neck 12 in response to rotation of nozzle-insertion housing 140 in a removal direction, opposite the installation direction. Threads 15 allow for removal of capless closure assembly 14 from fuel-tank filler neck 12 to thereby facilitate service of capless closure assembly 14.

Installation-and-detachment guide means may be configured to rotatably engage fuel-tank filler neck 12 in response to, for example, a rotation of the capless filler neck closure about an axis of rotation through an angle of 45° (i.e. eighth-turn), 90° (i.e. quarter turn), or more than 360° (i.e. full turn) as discussed further in the present disclosure. In illustrative embodiments, the installation and detachment guide means comprises a quarter-turn thread concept shown in FIG. 8 for mating with a filler neck shown in FIG. 9 or an eighth-turn thread concept shown in FIG. 10 for mating with a filler neck shown in FIG. 11. The full-turn thread concept is shown in FIGS. 1-7.

Figure 2A:
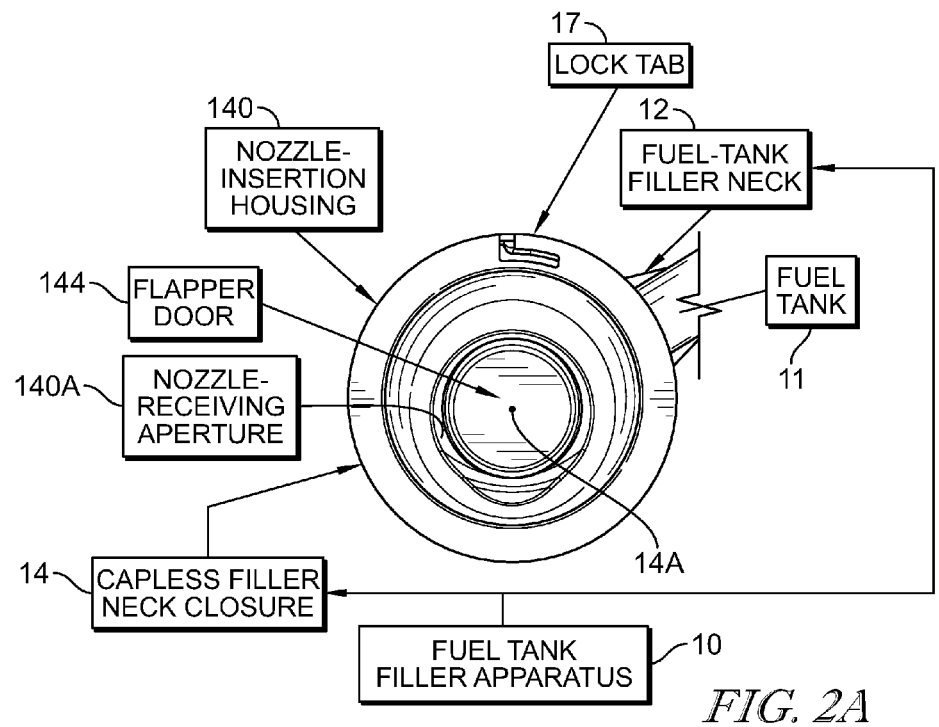
FIG. 2A is a top plan view of the rotatable capless filler neck closure in accordance with the present disclosure shown in a temporary stationary position on the underlying fuel-tank filler neck and showing that the rotatable capless filler neck closure includes an anti-rotation lock tab for blocking rotation of the rotatable capless filler neck closure relative to the fuel-tank filler neck.
Figure 2B:
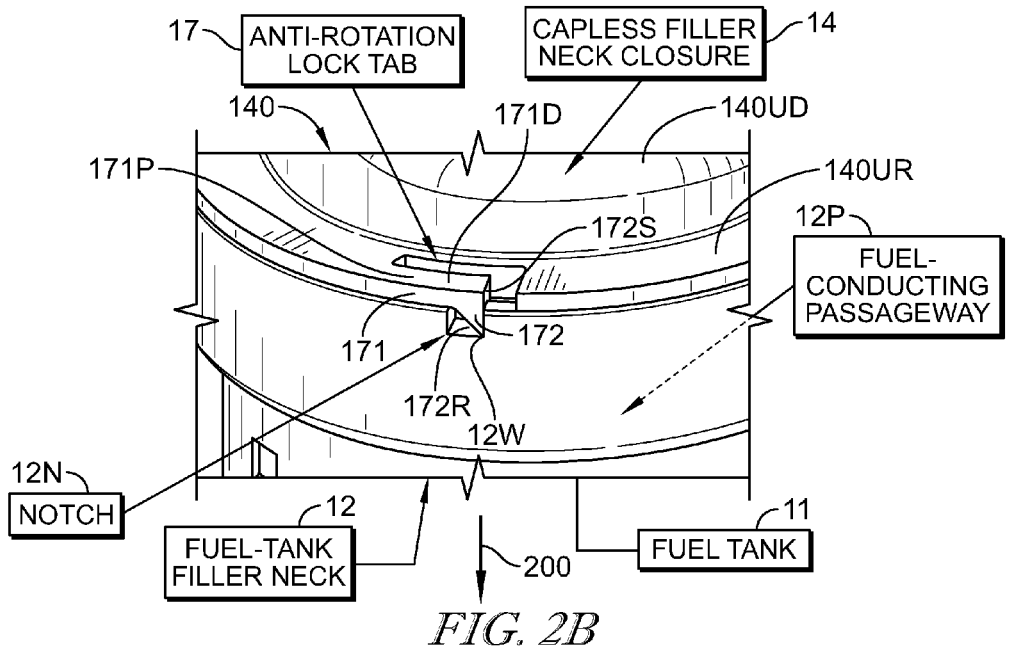
FIG. 2B is an enlarged view of a portion of the fuel tank fill apparatus of FIG. 2A showing that a pawl tooth included in an anti-rotation lock tab received in a tooth-receiving notch formed in the fuel tank-filler neck to block rotation of the capless filler neck closure in a removal direction.

Capless filler neck closure 14 further comprises a lock tab 17 coupled to nozzle-insertion housing 140 that provides anti-rotation means for retaining nozzle-insertion housing 140 in the stationary installed position in the fuel-conducting passageway 12P in the fuel-tank filler neck 12, temporarily, as suggested in FIGS. 1B and 2B. The lock tab 17 includes a resilient tooth-support finger 171 having a proximal end 171P that is coupled to nozzle-insertion housing 140 and a distal end 171D that is coupled to a pawl tooth 172 sized to fit into a tooth-receiving notch 12N formed in fuel-tank filler neck 12. Pawl tooth 172 is received in tooth-receiving notch 12N following arrival of nozzle-insertion housing 140 at the stationary installed position after a sufficient, predetermined amount of rotation of nozzle-insertion housing 140 relative to fuel-tank filler neck 12 about the axis of rotation 14A. The resilient tooth-support finger 171 and the pawl tooth 172 cooperate to define an anti-rotation lock tab 17 that is cantilevered to the nozzle-insertion housing 140 in illustrative embodiments.

Capless filler neck closure 14 is adapted to be mounted on and removed from a fuel-tank filler neck 12 without being decoupled easily or unintentionally from fuel tank 11 as suggested in FIGS. 1B and 2B. Capless filler neck closure 14 is also configured to be retained temporarily in an installed position in the fuel-tank filler neck 12 to permit a user to use a fuel-dispensing pump nozzle 8 to discharge fuel into fuel-tank filler neck 12 through a nozzle-receiving passageway 14P formed in the rotatable capless filler neck closure 14 without removing a fuel cap from the fuel-tank filler neck 12. In accordance with the present disclosure, the rotatable capless filler neck closure 14 is not welded permanently in a stationary installed position in the filler neck 12. Rather, the rotatable capless filler neck closure 14 is configured to be rotatably engaged to and disengaged from the fuel-tank filler neck 12 by a factory or service technician in response to rotation of the rotatable capless filler neck closure 14 about an axis 14A relative to the fuel-tank filler neck 12.

The illustrative rotatable capless filler neck closure 14 is configured to be rotatably engaged to the fuel-tank filler neck 12 at a factory by rotation about an axis 14A in a clockwise closure-installation direction to assume the stationary installed position at which time the lock tab 17 blocks rotation in a removal direction as suggested in FIGS. 1B and 2B. In illustrative embodiments, the anti-rotation lock tab 17 is configured to be broken and removed by a service technician so that the rotatable capless filler neck closure 14 can be removed from its stationary installed position in the fuel-tank filler neck 12 for servicing or repair as suggested in FIGS. 1B and 2B. When service or repair has been completed, a new nozzle-insertion housing 140 with an unbroken anti-rotation lock tab 17 may be used to replace the original nozzle-insertion housing 14 having the anti-rotation broken lock tab 17 and a refurbished rotatable capless filler neck closure 14 including the new nozzle-insertion housing 140 can be engaged to the fuel-tank filler neck 12 to assume the stationary installed position in the filler neck 12.

Pawl tooth 172 is arranged and oriented to extend in an axially downward direction 200 in generally spaced-apart parallel relation to rotation axis 14A as shown in FIGS. 1B and 2B. Pawl tooth 172 is configured to include a flat stop face (surface) 172S that is arranged to engage the rotation-blocking wall 12W formed in fuel-tank filler neck 12 to illustratively border tooth-receiving notch 12N during any attempt to rotate capless filler neck closure 14 about rotation axis 14A in a counterclockwise direction once the rotatable capless filler neck closure 14 has arrived at the stationary installed position in the fuel-tank filler neck 12 as suggested in FIG. 2B. Pawl tooth 172 is also configured to include a cam surface 172R arranged to interconnect stop face 172S and a portion of tooth-support finger 171. Cam surface 172R arranged contact fuel-tank filler neck 12 during rotation of capless closure assembly 14 in the installation direction before capless closure assembly 14 reaches the stationary installed position. Contact of the cam surface 172R with fuel-tank filler neck 12 causes resilient tooth-support finger 171 to deform until capless closure assembly 14 reaches the stationary installed position.

Figure 7:
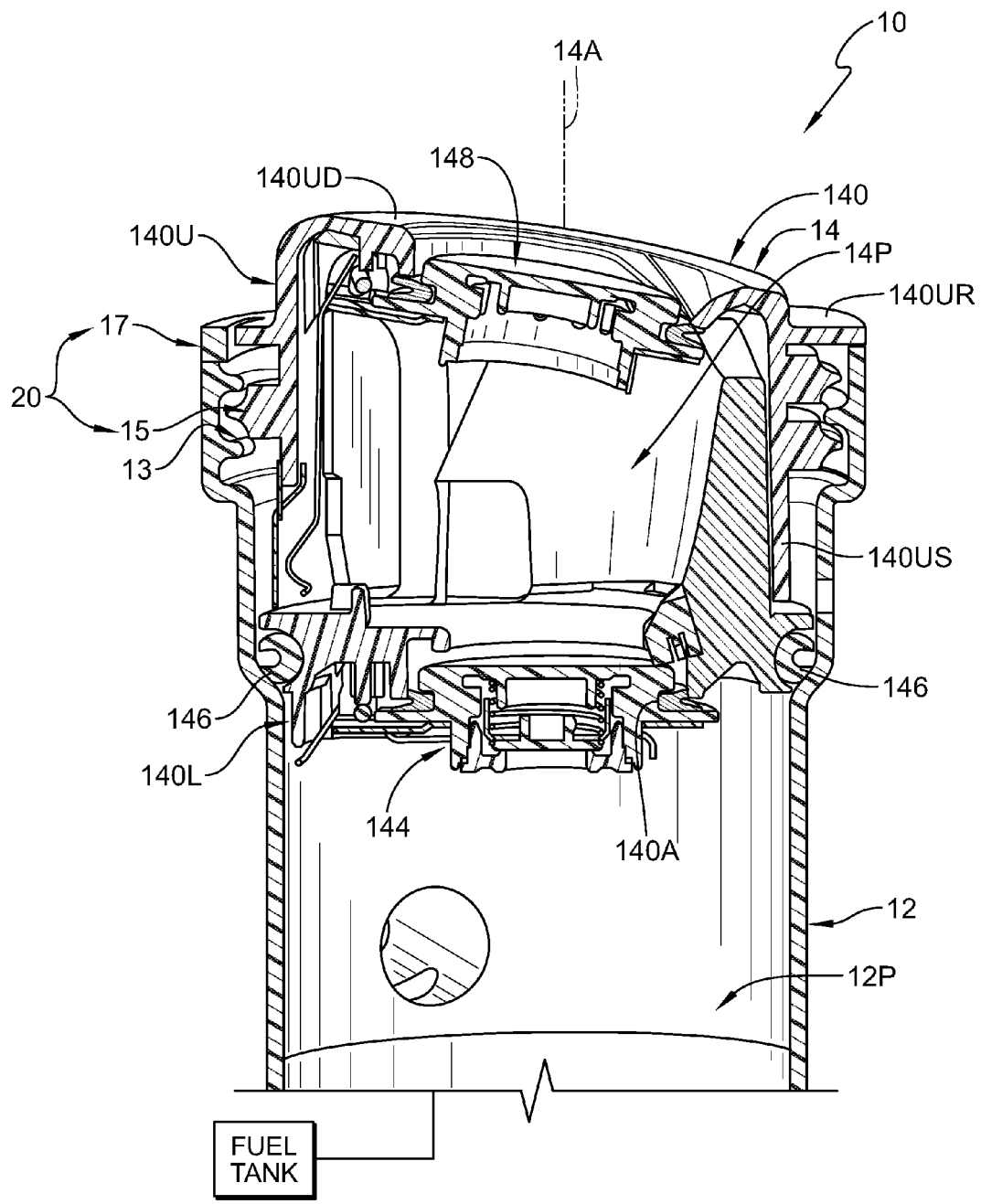
FIG. 7 is a sectional view of the fuel tank fill apparatus of FIG. 5 showing that the rotatable capless filler neck closure is retained temporarily in the stationary installed position extending into the fuel-conducting passageway formed in the fuel-tank filler neck and showing (1) engagement of the external thread of the capless filler neck closure with the companion internal thread of the fuel-tank filler neck, (2) engagement of an O-ring sealing gasket of the capless filler neck closure with an interior wall of the fuel-tank filler neck, and (3) orientation of separate outer and inner spring-loaded flapper doors in closed positions closing outer and inner nozzle-receiving apertures formed in the nozzle-insertion housing.

Capless filler neck closure 14 is shown in more detail in FIGS. 5-7. Nozzle-insertion housing 140 includes an upper shell 140U formed to include anti-rotation lock tab 17 and external thread 15 and a lower shell 140L configured to mate with upper shell 140U and define the nozzle-receiving passageway 14P therebetween as suggested in FIG. 7. Rotatable capless filler neck closure 14 also includes a spring-biased flapper door 144 mounted for pivotable movement on lower shell 140L to open and close an inner nozzle-receiving aperture 140A formed in lower shell 140L. Rotatable capless filler neck closure 14 also includes an O-ring seal 146 carried on lower shell 140L of nozzle-insertion housing 140 and arranged to engage an inner wall 121 of fuel-tank filler neck 12 to block flow of liquid fuel and fuel vapor therebetween upon arrival of the rotating capless filler neck closure 14 at the stationary installed position in fuel-tank filler neck 12.

Upper shell 140U of nozzle-insertion housing 140 comprises an axially extending sleeve 140US, an annular, radially outwardly extending, outer rim 140UR, and a dome 140UD coupled to an upper end of the axially extending sleeve 140US and formed to include an outer nozzle-receiving aperture 140UA that opens into nozzle-receiving passageway 14P as shown, for example, in FIGS. 3, 6, and 7. As suggested in FIGS. 2-5, proximal end 171P of tooth-supporting finger 171 of anti-rotation lock tab 17 is coupled to outer rim 140UR of upper shell 140U. Outer rim 140UR and anti-rotation lock tab 17 cooperate to form an L-shaped slot therebetween as suggested in FIGS. 2-5. An outer spring-biased flapper door 148 is mounted for pivotable movement on upper shell 140U to open and close an outer nozzle-receiving aperture 149 formed in upper shell 140U.

A second capless closure assembly 14', shown in FIG. 8, is configured for use with a second fuel-tank filler neck 12', shown in FIG. 9, to provide a fuel tank fill apparatus. Capless closure assembly 14' is similar to capless closure assembly 14 described above as suggested by similar reference numbers. Fuel-tank filler neck 12' is similar to fuel-tank filler neck 12 described above as suggested by similar reference numbers. Description of capless closure assembly 14 and fuel tank filler neck 12 is hereby incorporated by reference to describe capless closure assembly 14 and fuel tank filler neck 12 except in instances when it conflicts with the specific description thereof and FIGS. 8-9.

Capless closure assembly 14' includes a closure retention system 20' having quarter-turn threads 15' as shown in FIG. 8. Threads 15' provide installation-and-detachment guide means for engaging fuel-tank filler neck 12' in response to rotation of axis 14A' of capless closure assembly 14' with fuel-tank filler neck 12' and for rotatably disengaging capless closure assembly 14' from fuel-tank filler neck 12'.

Threads 15' are a rotational engagement mechanism and allow for removal of capless closure assembly 14' from fuel-tank filler neck 12' to thereby facilitate service of capless closure assembly 14' as suggested in FIG. 8. Threads 15' extend only part-way around a nozzle-insertion housing 140 of the capless closure assembly 14' and are configured for quarter-turn installation.

Fuel-tank filler neck 12' is adapted to be coupled to fuel tank 11 as shown in FIG. 9. Fuel-tank filler neck 12' includes internal threads 13' that correspond to threads 15' extend only part-way around passageway 12P as shown in FIG. 9.

A third capless closure assembly 14", shown in FIG. 10, is configured for use with a second fuel-tank filler neck 12", shown in FIG. 11, to provide a fuel tank fill apparatus. Capless closure assembly 14" is similar to capless closure assembly 14 described above as suggested by similar reference numbers. Fuel-tank filler neck 12" is similar to fuel-tank filler neck 12 described above as suggested by similar reference numbers. Description of capless closure assembly 14 and fuel tank filler neck 12 is hereby incorporated by reference to describe capless closure assembly 14 and fuel tank filler neck 12 except in instances when it conflicts with the specific description thereof and FIGS. 10-11.

Capless closure assembly 14" includes a closure retention system 20" having a lug-receiving channel 15" that allows for one-eighth turn installation of capless closure assembly 14" as suggested in FIG. 10. Lug-receiving channel 15" provides installation-and-detachment guide means for engaging fuel-tank filler neck 12" in response to rotation of capless closure assembly 14" with fuel-tank filler neck 12" and for rotatably disengaging capless closure assembly 14" from fuel-tank filler neck 12".

Lug-receiving channel 15" is a rotational engagement mechanism as suggested in FIGS. 10 and 11. Lug-receiving channel has a radial portion 15R" that extends parallel to the rotation axis 14K' and a circumferential portion 15C" that extends around the rotation axis 14A". Circumferential portion 15C" of lug-receiving channel 15" extends about one-eighth of the way around nozzle-insertion housing 140 such that installation requires about 45 degrees of rotation to reach the stationary installed position. Lug-receiving channel 15" is defined by upper rim 140UR of the nozzle-installation housing 140 and a plurality of channel walls 151, 152 coupled to the nozzle-installation housing 140.

Fuel-tank filler neck 12" includes a sidewall 121 that defines passageway 12P and lugs 13" extend inwardly from side wall 121 as shown in FIG. 11. Lug-receiving channel 15" is sized to accept a lug 13" via opening 150G as suggested in FIGS. 10 and 11. Fuel-tank filler neck 12 also includes notch lugs 121" that extend inwardly from side wall 121" to define tooth-receiving notch 12N" and stop wall 12W" that are engaged by lock tab 17" to provide anti-rotation means for holding capless closure assembly 14" in place when rotated into the stationary installed position.

Yet another fuel tank fill apparatus 210 is shown in FIGS. 12-16. Fuel tank fill apparatus 210 includes a fuel-tank filler neck 212 and a capless closure assembly 214. Capless closure assembly 214 includes a closure retention system 220 adapted to couple capless closure assembly 214 to fuel-tank filler neck 212 to allow for service while avoiding unintentional removal by users.

Figure 12:
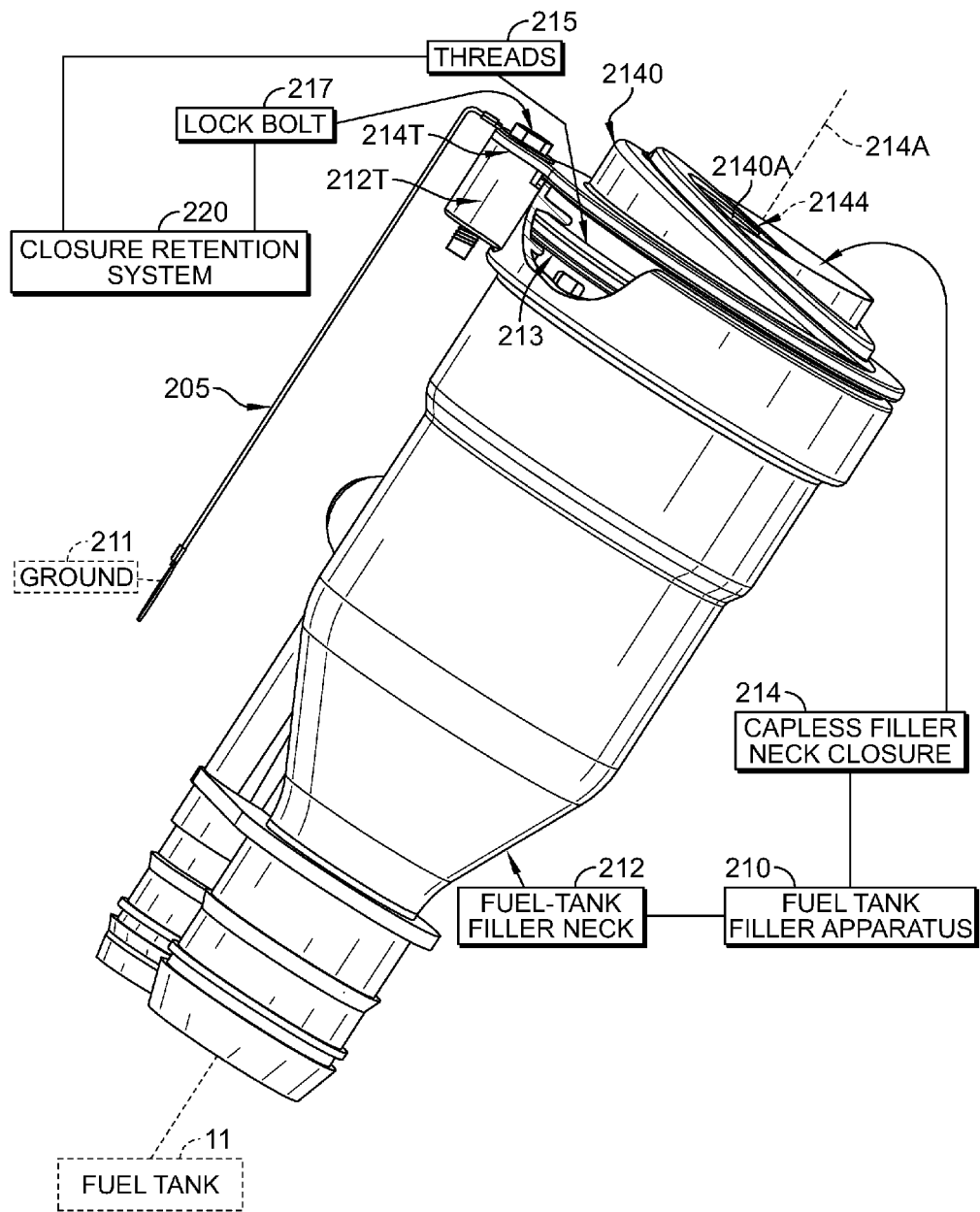
FIG. 12 is a perspective view of another fuel tank fill assembly adapted for use with a fuel tank showing that the fuel tank fill assembly includes a lock bolt that provides an anti-rotation feature as part of a closure retention system that couples a rotatable capless filler neck closure to the fuel-tank filler neck.
Figure 13:
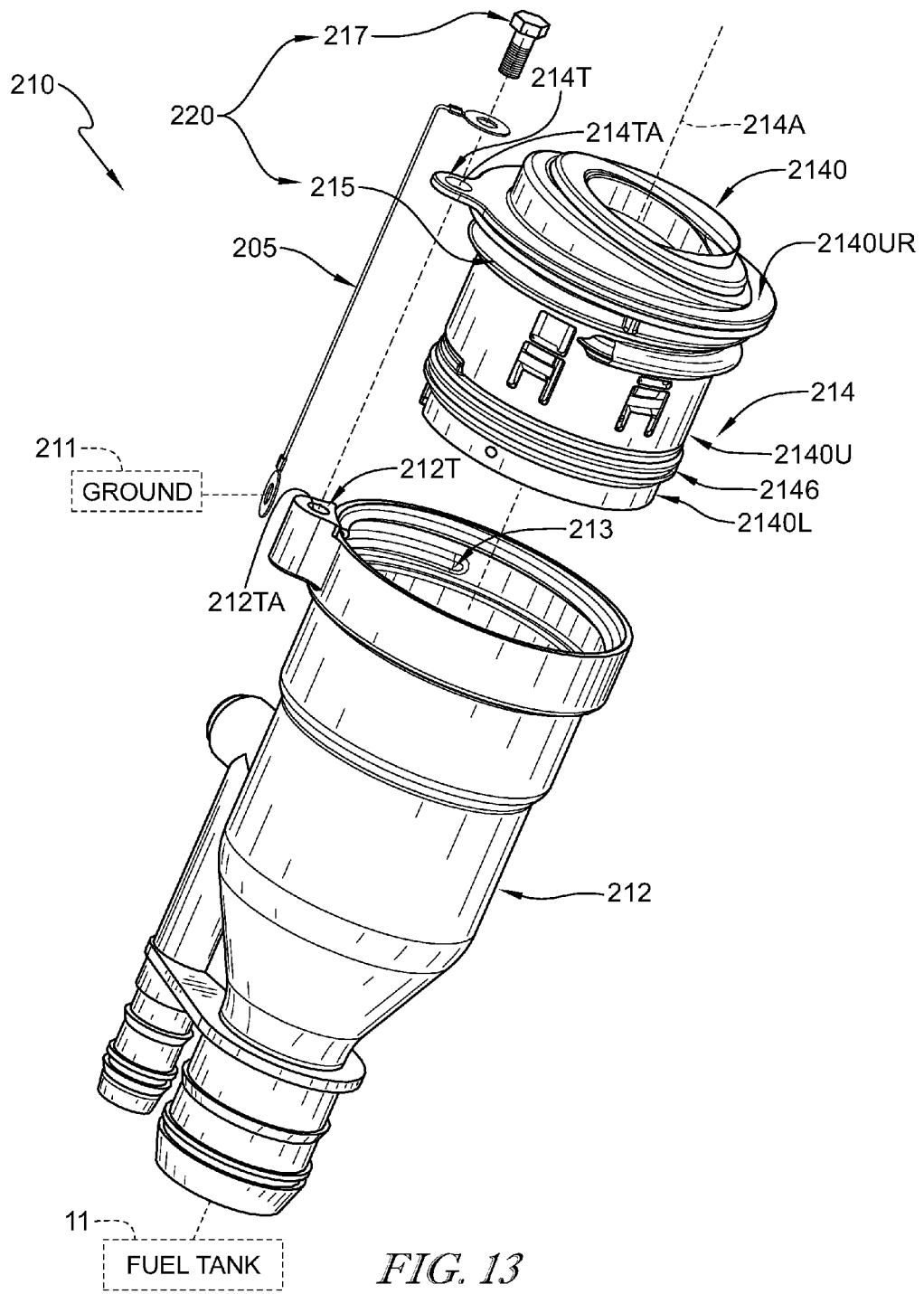
FIG. 13 is an exploded perspective assembly view of the fuel tank fill assembly of FIG. 12 showing that the fuel-tank filler neck and the capless filler neck closure each include retention tabs formed to include bolt-receiving apertures through which the lock bolt extends to block rotation of the capless filler neck closure.

Closure retention system 220 includes threads 215 and lock bolt 217 as shown in FIGS. 12-14. Threads 215 provide installation-and-detachment guide means for engaging fuel-tank filler neck 212 in response to rotation of capless closure assembly 214 with fuel-tank filler neck 212 and for rotatably disengaging capless closure assembly 214 from fuel-tank filler neck 212. Lock bolt 217 is configured to provide anti-rotation means for blocking rotation of capless closure assembly 214 when in a stationary installed position after a predetermined amount of rotation of nozzle-insertion housing 2140 so that unintentional removal of the capless closure assembly is avoided.

Threads 215 are illustratively external threads that create a rotational engagement mechanism for coupling to corresponding internal threads 213 included in fuel-tank filler neck 212 as shown in FIGS. 12-14. Threads 215 extend more than 360 degrees so that installation of capless closure assembly 214 requires at least 360 degrees of rotation.

Lock bolt 217 extends through tabs 212T, 214T included in fuel-tank filler neck 212 and capless closure assembly 214 to provide an anti-rotation feature as shown in FIGS. 12 and 14. Lock bolt 217 illustratively extends parallel to a rotation axis 214A about which capless closure assembly 214 is turned for installation onto fuel-tank filler neck 212.

Capless closure assembly 214 illustratively includes a nozzle-insertion housing 2140 that is sized to extend into a fuel-conducting passageway 212P formed in fuel-tank filler neck 212 and a spring-biased flapper doors 2142, 2144 mounted on nozzle-insertion housing 2140 for movement relative to nozzle-insertion housing 2140 between a closed position closing a nozzle-receiving aperture 2140A formed in nozzle-insertion housing 2140 and an opened position opening the nozzle-receiving aperture 2140A.

Nozzle-insertion housing 2140 includes an upper shell 2140U and a lower shell 2140L configured to mate with upper shell 2140U and define the nozzle-receiving passageway 214P as suggested in FIG. 14. Rotatable capless filler neck closure 214 also includes a spring-biased flapper door 2144 mounted for pivotable movement on lower shell 2140L. Rotatable capless filler neck closure 214 also includes an O-ring seal 2146 carried on lower shell 2140L of nozzle-insertion housing 2140 and arranged to engage an inner wall of fuel-tank filler neck 212 to block flow of liquid fuel and fuel vapor therebetween upon arrival of the rotating capless filler neck closure 14 at the stationary installed position.

Upper shell 2140U of nozzle-insertion housing 2140 comprises an axially extending sleeve 2140US, an annular, radially outwardly extending, outer rim 2140UR, and a dome 2140UD coupled to an upper end of the axially extending sleeve 2140US and formed to include an outer nozzle-receiving aperture 2140UA that opens into nozzle-receiving passageway 214P as shown, for example, in FIG. 14. An outer spring-biased flapper door 2148 is mounted for pivotable movement on upper shell 2140U to open and close an outer nozzle-receiving aperture formed in upper shell 2140U.

A first lock bolt receiving tab 212T extends from a side wall of fuel-tank filler neck 212 and is formed to include an aperture 212TA as shown in FIG. 13. A second lock bolt receiving tab 214T extends from outer rim 2140UR of nozzle-insertion housing 2140 and is formed to include an aperture 214TA. Apertures 212TA and 214TA are aligned when capless closure assembly 214 is in the stationary installed position and lock bolt 217 extends through them parallel to axis 214A.

A ground wire 205 terminating at 211 is included in the fuel tank fill assembly 210 and has an interface eyelet 205I engaged with head of lock bolt 217 as shown in FIG. 15. A wire 205L extends from eyelet 205I. In some embodiments, eyelet 205I may be engaged with threads of lock bolt 217 as shown in FIG. 16.

The invention claimed is:

1. A capless closure assembly for a fuel tank filler neck, the assembly comprising
a nozzle-insertion housing formed to include a nozzle-receiving aperture and sized to extend into a fuel-conducting passageway,
a flapper door mounted on the nozzle-insertion housing for movement relative to the nozzle-insertion housing from a closed position closing the nozzle-receiving aperture to an opened position opening the nozzle-receiving aperture, and
a closure retention system including installation-and-detachment guide means coupled to the nozzle-insertion housing for engaging the fuel-tank filler neck in response to rotation of the nozzle-insertion housing in an installation direction to retain the nozzle-insertion housing temporarily in a stationary installed position in a fuel-conducting passageway formed in the fuel-tank filler neck and for rotatably disengaging the nozzle-insertion housing in response to rotation of the nozzle-insertion housing in a removal direction, opposite the installation direction, so as to allow for removal of the capless closure assembly from the fuel-tank filler neck to thereby facilitate service of the capless closure assembly, and anti-rotation means for blocking rotation in the removal direction upon arrival of the capless closure assembly at a stationary installed position after a predetermined amount of rotation of the nozzle-insertion housing in the installation direction so that unintentional removal of the capless closure assembly is avoided.

2. The assembly of claim 1, wherein the anti-rotation means includes a lock tab provided by a resilient tooth-support finger and a pawl tooth sized to fit into a tooth-receiving notch formed in the fuel-tank filler neck, the resilient tooth-support finger having a proximal end coupled to the nozzle-insertion housing and a distal end that is coupled to the pawl tooth.

3. The assembly of claim 2, wherein the pawl tooth is shaped to include a cam surface arranged to contact the fuel-tank filler neck during rotation of the capless closure assembly in the installation direction before the capless closure assembly reaches the stationary installed position and cause the resilient tooth-support finger to deform until the capless closure assembly reaches the stationary installed position.

4. The assembly of claim 3, wherein the pawl tooth is shaped to include a blocker surface that extends parallel to a rotation axis about which the capless closure assembly rotates when rotated in the installation direction, the blocker surface adapted to face a surface that defines the tooth-receiving notch of the fuel tank filler neck when the capless closure assembly reaches the stationary installed position.

5. The assembly of claim 1, wherein the installation-and-detachment guide means includes external threads coupled to the nozzle-insertion housing and configured to mate with companion threads included in the fuel-tank filler neck.

6. The assembly of claim 5, wherein the external threads extend continuously more than 360 degrees around the nozzle-insertion housing such that rotation of the nozzle-insertion housing in the installation direction requires at least 360 degrees of rotation to reach the stationary installed position.

7. The assembly of claim 1, wherein the installation-and-detachment guide means includes a lug-receiving channel having a radial portion that extends parallel to a rotation axis about which the capless closure assembly rotates when rotated in the installation direction and a circumferential portion that extends around the rotation axis about which the capless closure assembly rotates when rotated in the installation direction, the lug-receiving channel sized to accept a lug that extends from the fuel-tank filler neck toward the rotation axis about which the capless closure assembly rotates when rotated in the installation direction.

8. The assembly of claim 7, wherein the circumferential portion of the lug-receiving channel extends about one-eighth of the way around the nozzle-insertion housing and rotation of the nozzle-insertion housing in the installation direction requires about 45 degrees of rotation to reach the stationary installed position.

9. The assembly of claim 7, wherein the lug-receiving channel is defined by an upper rim of the nozzle-installation housing and a plurality of channel walls coupled to the nozzle-installation housing.

10. The assembly of claim 1, wherein the anti-rotation means includes a lock bolt that extends through the nozzle-insertion housing to engage the fuel-tank filler neck associated with the capless closure assembly when the capless closure assembly is coupled to the fuel-tank filler neck.

11. A fuel tank fill apparatus adapted to conduct fuel toward a fuel tank, the apparatus comprising
 a fuel-tank filler neck including a side wall that defines a fuel-conducting passageway and threads coupled to the side wall, and
 a capless closure assembly coupled to the fuel tank filler neck, the capless closure assembly including a nozzle-insertion housing formed to include a nozzle-receiving aperture and sized to extend into a fuel-conducting passageway, a flapper door mounted on the nozzle-insertion housing for movement relative to the nozzle-insertion housing from a closed position closing the nozzle-receiving aperture to an opened position opening the nozzle-receiving aperture, and a closure retention system including threads coupled to the nozzle-insertion housing engaged with the threads of the fuel-tank filler neck and an anti-rotation feature that blocks rotation of the capless closure assembly relative to the fuel-tank filler neck.

12. The apparatus of claim 11, wherein the anti-rotation feature includes a pawl tooth received in a tooth-receiving notch formed in the fuel-tank filler neck and a resilient tooth-support finger having a proximal end coupled to another component of the nozzle-insertion housing and a distal end that is coupled to the pawl tooth.

13. The apparatus of claim 12, wherein the pawl tooth is shaped to include a blocker surface that extends parallel to a rotation axis about which the capless closure assembly rotates when installed onto the fuel-tank filler neck.

14. The apparatus of claim 11, wherein the threads of the capless closure assembly extend continuously more than 360 degrees around the nozzle-insertion housing.

15. The assembly of claim 11, wherein the anti-rotation feature includes a lock bolt that extends through the nozzle-insertion housing to engage the fuel-tank filler neck.

16. The assembly of claim 15, wherein the nozzle-insertion housing includes a tab formed to include an aperture through which the lock bolt extends, the fuel-tank filler neck includes a tab formed to include an aperture through which the lock bolt extends, and the lock bolt extends along an axis parallel to a rotation axis about which the capless closure assembly rotates when installed onto the fuel-tank filler neck.

17. A fuel tank fill apparatus adapted to conduct fuel toward a fuel tank, the apparatus comprising
 a fuel-tank filler neck including a side wall that defines a fuel-conducting passageway and threads coupled to the side wall, and
 a capless closure assembly coupled to the fuel tank filler neck, the capless closure assembly including a nozzle-insertion housing formed to include a nozzle-receiving aperture and sized to extend into a fuel-conducting passageway, a flapper door mounted on the nozzle-insertion housing for movement relative to the nozzle-insertion housing from a closed position closing the nozzle-receiving aperture to an opened position opening the nozzle-receiving aperture, and a closure retention system including a rotational engagement mechanism configured to engage the fuel-tank filler neck upon rotation of the capless closure assembly relative to the fuel-tank filler neck in an installation direction and an anti-rotation feature that blocks rotation of the capless closure assembly relative to the fuel-tank filler neck in a removal direction.

18. The apparatus of claim 17, wherein the anti-rotation feature includes a pawl tooth received in a tooth-receiving notch formed in the fuel-tank filler neck.

19. The apparatus of claim 18, wherein the anti-rotation feature includes a resilient tooth-support finger having a proximal end coupled to an outer rim of the nozzle-insertion housing and a distal end that is coupled to the pawl tooth.

20. The apparatus of claim 17, wherein the anti-rotation feature includes a lock bolt that extends through an aperture formed in the nozzle-insertion housing to engage the fuel-tank filler neck and block rotation of the capless closure assembly relative to the fuel-tank filler neck.

* * * * *